June 24, 1969 P. B. DAHLEN 3,452,163
OPTICAL PHONOGRAPH APPARATUS WITH POLARIZED LIGHT
Filed Dec. 8, 1965 Sheet 1 of 2

INVENTOR.
PHILLIP B. DAHLEN
BY Braddock & Burd
ATTORNEYS

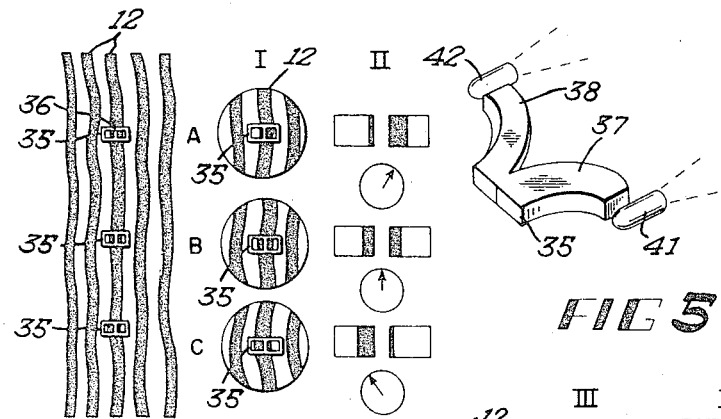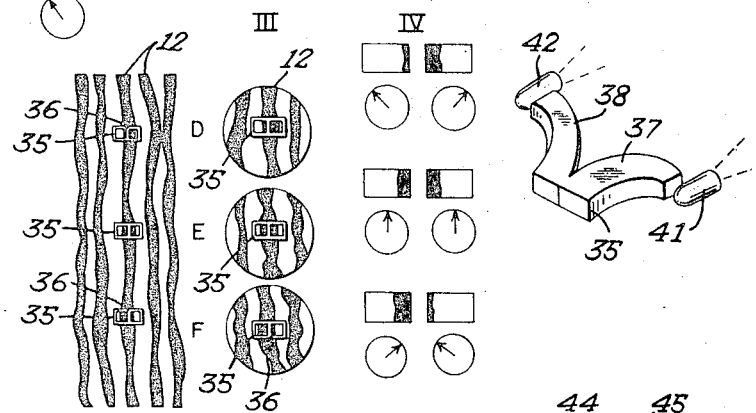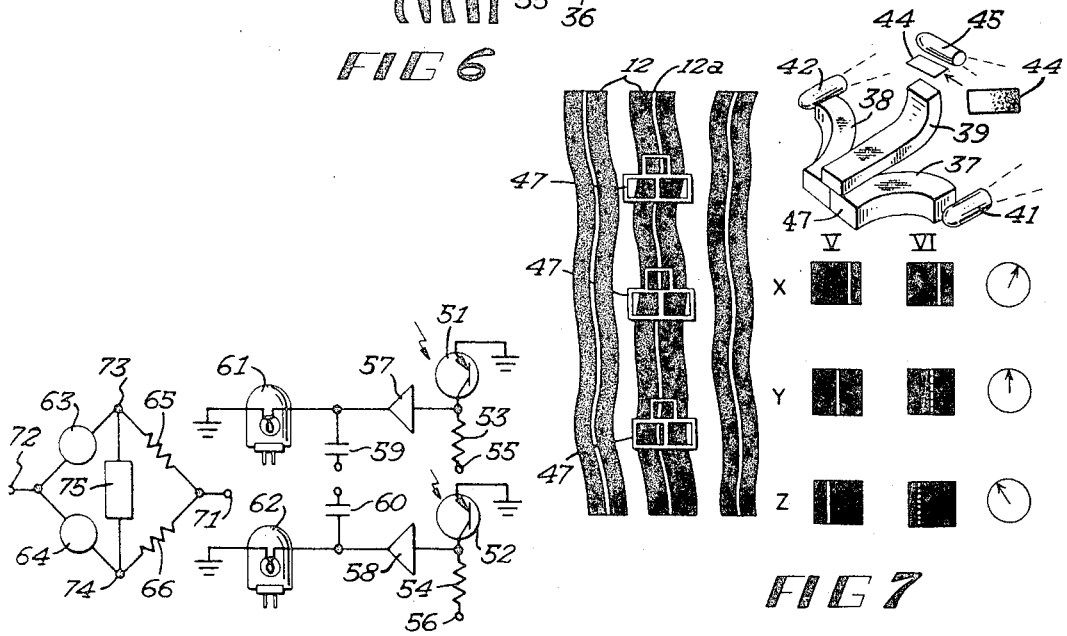
FIG 5
FIG 6
FIG 7
FIG 8
INVENTOR.
PHILLIP B. DAHLEN
BY Braddock & Burd
ATTORNEYS United States Patent Office 3,452,163
Patented June 24, 1969

3,452,163
**OPTICAL PHONOGRAPH APPARATUS
WITH POLARIZED LIGHT**
Phillip B. Dahlen, 512 49th Ave. N.,
Minneapolis, Minn. 55430
Filed Dec. 8, 1965, Ser. No. 512,446
Int. Cl. G11b 3/00, 11/10; H01r 11/08
U.S. Cl. 179—100.4                                    16 Claims

ABSTRACT OF THE DISCLOSURE

An optical phonograph having first optic means for providing a beam of light through an objective lens to impinge on the surface of a record, a portion of the objective lens being shaded from the light. The reflected light from the surface of the phonograph record passes through the shaded portion of the objective lens into a second optic system where it is filtered to remove polarized light and the image thus formed is passed to sound reproduction means. The sound reproduction means comprises a pair of fiber optic rods that receive the reflected image at their input ends and are joined together at their output ends to form a micro-fine junction; and photoelectric responsive devices positioned adjacent the output ends of the fiber optic rods to respond to the image provided thereto. Tone arm position control means are also provided, and are entirely spaced from the surface of the phonograph record and positioned to respond to the reflected image from the surface of the phonograph record, to position the tone arm.

---

This invention is concerned with phonograph apparatus, and more particularly with optical and electric apparatus for the reproduction of sound from a grooved phonograph record.

Most phonographs known in the prior art use mechanical means, such as a needle, in contact with the grooves in a phonograph record or a disc to provide a mechanical vibration which is transduced into an electrical signal for the reproduction of sound. This type of phonograph has obvious limitations, one of the primary disadvantages being that the force of the needle against the groove tends to wear the groove after the record has been played a substantial number of times. Some prior art phonographs have attempted to overcome this problem by introducing an optical technique of picking up the sound recordings from the grooved phonograph. Many of these systems must still have a guiding stylus in contact with the record, while others, through not mechanically contacting the records, have been found to require too much adjustment or to be incapable of playing either monaural or stereo recordings.

The apparatus of this invention overcomes the above-mentioned problems by providing an optical system for "playing" or reproducting sound from a grooved phonograph record or disc, which system requires no mechanical contact with the grooves in the record, and is capable of playing monaural and stereo recordings at various speeds.

Briefly described, the apparatus of this invention comprises a first optical system for providing light to an objective lens, which light passes through the objective lens to impinge upon a groove in a phonograph record. The light reflected from the record passes back through the objective lens and into a second optical system which provides an image to a light mask. An aperture in the mask is divided, and the variance in light hitting on either side of the division in the mask is transduced into an electrical signal for use with normal sound reproduction means such as pre-amplifiers, amplifiers and speakers.

The second optical system of the apparatus of this invention includes an optical member which is placed between the first optical system and the objective lens to shade a predetermined portion of the objective lens from the light provided by the first optical system. The ilght reflected from the record which passes through the shaded portion of the objective lens is then filtered within the second optical system before the image is focused on the mask to remove polarized reflected light.

In addition to providing a signal for the reproduction of sound, the electrical signal available from the mask is used to provide a position control signal to a control system for moving the tone arm, which system is in essence a damped, closed servo-loop which tends to keep the tone arm in such a position that the light impinging on the record strikes the groove in the record. Means are also provided for rotation of the grooved record at the proper speed.

In another embodiment, the mask mentioned above forms an aperture divided into three portions. Two of the portions operate as described above to provide the control signal for the proper positioning of the tone arm, and third portion is used in conjunction with a light filter of graduated density to provide an electrical signal for the reproduction of sound. The signal varies depending on the point on the graduated light filter at which the reflected light impinges.

In the drawings:

FIG. 5 is a diagrammatical illustration showing the manner in which the apparatus of this invention is used to derive a signal form a monaural groove in a record;

FIG. 6 is a diagrammatical illustration showing the manner in which the apparatus of this invention is used to derive a signal from a stereo groove in a record;

FIG. 7 is a diagrammatical illustration showing the manner in which the apparatus of this invention is used to derive a signal from a monaural groove in an older-type record or disc having a wide groove; and FIG. 8 includes schematic drawings of the apparatus used to change the optical signal to an electrical signal for sound reproduction and tone arm position control.

Figure 1:
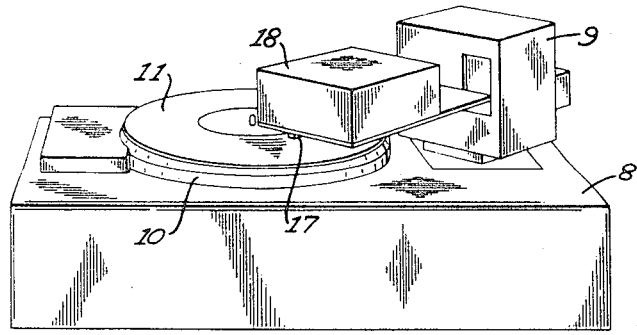
FIG. 1 is a perspective view of a phonograph exemplary of an embodiment of the apparatus of this invention.

In FIG. 1 there is shown a phonograph including a base 8 on which is mounted a turntable 10 adapted to carry a grooved phonograph record or disc 11. Apparatus for controlling the rotation of turntable 10 (not shown) can be mounted within base 8.

Also mounted on base 8 there is shown a chassis 9. Connected to chassis 9 is a tone arm 18 which carries an objective lens 17. Chassis 9 is movably mounted on base 8 and apparatus for controlling the position of tone arm 18, and therefore objective lens 17, can be mounted within base 8 and chassis 9.

Figure 2:
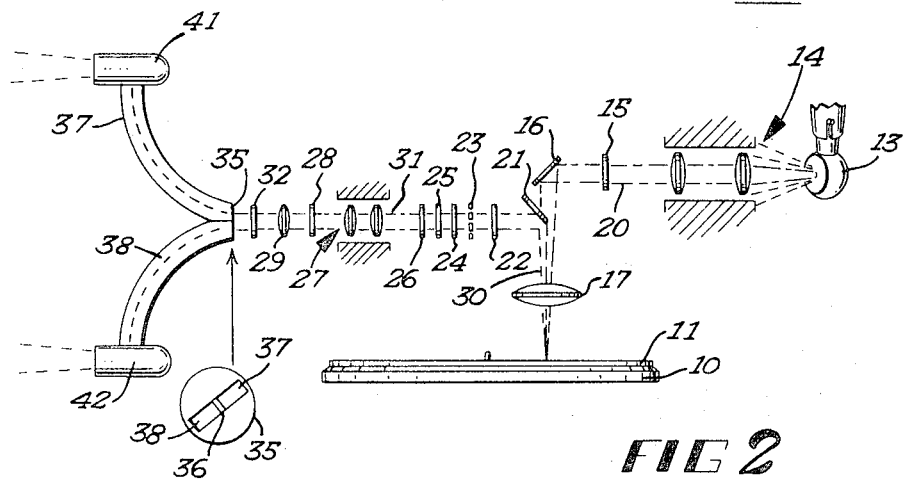
FIG. 2 is a diagrammatical view showing the path that a light beam takes to and from the record desired to be played,through the optical systems.

In FIG. 2 there is shown the optical system which can be mounted in chassis 9 and tone arm 18 to provide an optical image of the groove in record 11 for transduction into an electrical signal for the reproduction of sound. The optical system comprises a light bulb 13, which is painted with reflecting material over all of its surface area, except a smaller portion through which light is allowed to leave. A beam of light 20 which leaves bulb 13 first enters the back end of a telescope 14, and then passes through a prism 15. In this diagrammatical view all prisms are shown as straight line reflecting surfaces. After leaving prism 15, light beam 20 passes through a prism 16 where it is bent downward to pass through an objective lens 17. Light beam 20 then passes through objective lens 17 to impinge at a substantially perpendicular angle upon record 11 mounted on turntable 10. A prism 21 is interposed between prism 16 and objective lens 17 to prevent light beam 20 from striking more than a predetermined portion of objective lens 17.

A light beam 30, reflected from record 11 then passes up through the shaded portion of lens 17 to pass through prism 21, and to continue through a prism 22 to a polarizing filter 23. The portion of light beam 30 which has been polarized due to multiple reflections at record 11 will not pass through filter 23.

A light beam 31 which comprises the light which passes through filter 23 will then pass through a plurality of prisms 24, 25 and 26 to then pass through a microscope 27, a prism 28 and an eye lens 29, where the image of the reflected portion of record 11 is focused and then passed through a prism 32 to a light mask 35.

A pair of fiber optic rods 37 and 38 are joined together at one end adjacent an aperture in mask 35. The other end of rod 37 is connected to a light responsive device 41, and the other end of rod 38 is connected to a light responsive device 42. The blown-up view of mask 35 indicates that the aperture therein exposes the ends of fiber optic rods 37 and 38 to the reflected image of record 11. A junction 36 formed by the joining of rods 37 and 38 is in actuality micro-thin, but is here shown of some thickness for purposes of clarity in explanation.

Figure 3:
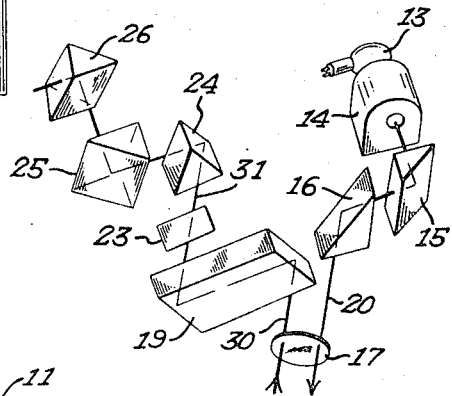
FIG. 3 is a diagrammatical view showing a portion of the optical system of the apparatus of this invention, and the path the light takes through the optical system of a particular embodiment of this invention.

In FIG. 3 there is shown a diagrammatical view of some of the prisms and lenses of FIG. 2 for the purpose of indicating the path of light beams 20, 30 and 31 through the optical systems in one embodiment of this invention. In FIG. 3 it can be seen that light bulb 13 provides light to back end of telescope 14, which causes the beam of light 20 to reach prism 15 which bends beam 20 about 90° to strike prism 16. Prism 16 again bends light beam 20 approximately 90° to direct it down through the unshaded portion of objective lens 17 toward record 11.

It is also shown how light beam 30, reflected from record 11, returns through the shaded portion of objective lens 17. In FIG. 3 it is shown how prisms 21 and 22 of FIG. 2 can be replaced by a rhombic prism 19. Rhombic prism 19 causes beam 30 to be directed through filter 23 which removes the portion of beam 30 which was polarized by multiple reflections at record 11. Light beam 31 emerges from filter 23 and is then passed through prisms 24, 25 and 26, all of which can be placed to vary the direction of beam 31 to conveniently carry the optical image within a casing of any desired configuration.

Figure 4:
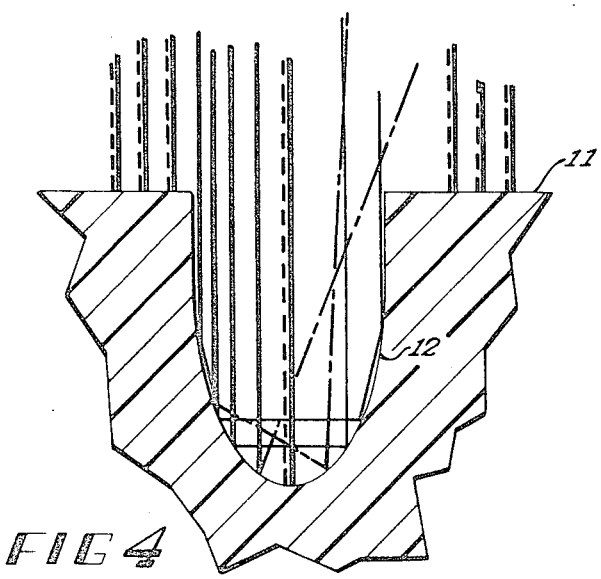
FIG. 4 is a side sectional view of a groove in a phonograph record or disc showing direct and reflected light patterns.

FIG. 4 discloses a blown-up sectional view of a groove 12 in record or disc 11. In this figure the thick solid lines represent the light impinging on record 11 and groove 12 which has passed through the unshaded portion of objective lens 17. The dashed lines and the thin solid lines represent the reflected light from record 11 and groove 12 which return through the unshaded portion of lens 17 to continue through the optical system. Of these, the thin solid lines are those which have undergone a plurality of reflections within groove 12 and have therefore become polarized. The broken lines of FIG. 4 represent that portion of light beam 20 which does not return through the unshaded portion of objective lens 17.

In FIG. 5 there is illustratively shown a plurality of images of the wobbles in a plurality of grooves 12 on a monophonic recording. Note that in a monophonic recording the wobbles of each side of the groove match. Superimposed on one of the characterized grooves 12 of FIG. 5 are a plurality of symbols representing mask 35 and the image it receives of the groove at three periods of time. In Column I of FIG. 5, the encircled views of a portion of grooves 12 and mask 35 represents the magnification of each of the corresponding views to the left at the three times at which the image is illustrated. In Column II of FIG. 5, there are shown in each of Rows A, B, and C a pair of rectangles, each representing, respectively, the left and right hand portion of the aperture in mask 35, and therefore the amount of light falling on fiber optic rods 37 and 38. An encircled arrow associated with each pair of rectangles indicates the side which is receiving the majority of the image of groove 12. The light carried through rods 37 and 38 to light responsive devices 41 and 42, respectively, is used to provide an electrical signal for both tone arm position control and sound reproduction.

In FIG. 6 there is seen a drawing which is the same as the drawing of FIG. 5, except the grooves 12 now represent grooves in a stereophonic recording. Note that in a stereophonic recording the wobbles in each side of groove 12 are independent. Again there are shown three positions in time of mask 35 superimposed on a groove 12. In Column III there are shown at Rows D, E, and F three magnifications of the groove 12 image at mask 35 for the three time positions, and in Column IV there are again shown the three respective rows of pairs of rectangles.

In FIG. 6, the lefthand rectangles of Column IV represent the image presented for deriving sound for one stereo channel, while the righthand rectangles represent images of sound for deriving a signal for the other stereo channel. The encircled arrows associated with each of the rectangles of Column IV indicate the amount of light being received by the respective fiber optic rod 37 or 38. An arrow pointing to the viewer's right indicates a decrease in light intensity, an arrow to the left indicates an increase in light intensity, and an arrow pointing straight up indicates a normal intensity.

In FIG. 7 there are shown further illustrative views of a groove 12, this time in a 78 r.p.m. recording. In this type of recording the groove 12 is often substantially wider than in recordings intended to be played at lower speeds of revolution. Therefore, the image reflected from such grooves will not be all black, as in FIGS. 5 and 6, but will have a reflected white centerline such as 12a. In FIG. 7 there is shown a mask 47, which is a variation of mask 35. Mask 47 is used to read the image of grooves 12 having a white centerline 12a. The lower aperture in mask 47 is placed adjacent fiber optic rods 37 and 38 as in the previously described apparatus. In the case of this type of recording, the signal from rods 37 and 38 is used only for tone arm position control. Another fiber optic rod 39 is placed adjacent the upper aperture in mask 47, and it is the signal received by rod 39 which is used for sound reproduction.

Referring to Column V there is shown in Rows X, Y, and Z representations of the position of centerline 12a within the upper aperture of mask 47 at the three periods of time. Referring now to the diagrammatical drawing of FIG. 7, it is seen that a filter 44 is placed between the other end of rod 39 and a light responsive device 45. As shown in the blown-up view, filter 44 is of a graduated density, the lefthand portion of filter 44 being of greater density than the righthand portion of filter 44. Thus the light from centerline 12a reaching light responsive device 45 will vary depending on the position at which centerline 12a impinges upon filter 44. This is illustrated in Column VI of FIG. 7, where the intensity of centerline 12a varies as it moves from right to left of the rectangle. The circled arrows associated with the rectangles of Rows X, Y and Z indicate the position of the centerline 12a within the rectangle, that is, within the upper aperture of mask 47.

In FIG. 8 there are shown schematics of electronic apparatus which can be used in conjunction with the above-described apparatus for the reproduction of sound from the optical image derived as described above. There is shown a pair of light-sensitive devices, here shown as photo-transistors 51 and 52. Photo-transistors 51 and 52 are mounted adjacent the ends of fiber optic rods 37 and 38, respectively, and each are connected in an electrical circuit. Transistor 51 has one electrode connected to ground, and another electrode connected through a resistor 53 to a terminal 55. Transistor 52 has one electrode connected to ground and another electrode connected through a resistor 54 to a terminal 56. Terminals 55 and 56 are adapted to be connected to a source of energy. The outputs of photo-transistors 51 and 52 are connected, respectively, to a pair of amplifiers 57 and 58. Amplifiers 57 and 58 are adapted to be connected to standard sound reproduction apparatus such as amplifiers and speakers. The outputs of amplifiers 57 and 58 are shown connected, respectively, to a pair of capacitors 59 and 60. Capacitors 59 and 60 are adapted to be connected to the standard sound reproduction apparatus for passing the AC portion of the outputs of amplifiers 57 and 58 to the apparatus.

In addition, the outputs of amplifiers 57 and 58 are connected, respectively, in an electrical circuit with a pair of incandescent light bulbs 61 and 62. The light intensity from bulbs 61 and 62 will vary in proportion to the signal made available from photo-transistors 51 and 52. Mounted adjacent bulbs 61 and 62 are a pair of light responsive devices 63 and 64, such as photocells. Photocells 63 and 64 are each mounted in one leg of a Wheatstone bridge. The other legs of the Wheatstone bridge contain resistors 65 and 66. A pair of input terminals 71 and 72 of the bridge are adapted to be connected to a source of energy. A pair of output terminals 73 and 74 of the bridge are shown connected to a tone arm control device 75. Control device 75 receives a signal from the Wheatstone bridge to vary the position of the tone arm, as will be more fully described below.

The operation of the apparatus of this invention will best be understood by first referring to FIG. 2. In FIG. 2 light bulb 13 is shown coated with a reflective material. The coating covers all but one side of bulb 13, through which light is allowed to pass. The light then passes through the rear end of double-lens telescope 14, and is focused into a narrow beam 20 of substantially parallel light. Beam 20 is then reflected within the pair of prisms 15 and 16, to pass through objective lens 17, which can be part of a microscope, and is focused as a small circle of light on the grooved surface of record or disc 11. Prism 21 acts as a shield, and does not allow beam 20 to pass through more than a predetermined portion of objective lens 17, the other half of lens 17 lying in the shadow of prism 21.

The light that is reflected off the surface of record 11 passes through both halves of objective lens 17. The portion of lens 17 which is exposed to beam 20 contains internal reflections which obliterate the image of the light reflected from the surface of record 11. The portion of lens 17 which is in the shadow of prism 21 allows the light reflected from the surface of record 11 to pass through without the addition of stray sources of light. The light which passes through the shaded portion of lens 17, here referred to as beam 30, is then reflected through the plurality of prisms 21, 22, 24, 25 and 26. These prisms serve merely to direct the path of the reflected light beam to decrease the size of the optical system. Their placement and selection is defined by the size and shape of, for example, tone arm 18 and chassis 9.

Some of light beam 30 is the result of multiple reflections within groove 12 of record 11 (see FIG. 4). This is stray light which, because of the multiple reflections, has become polarized. This stray polarized light is removed by means of a polarizing filter 23, placed between prisms 22 and 24. Thus the beam of light 31 which continues through the optical system downstream of filter 23 is essentially the reflected light which was substantially vertically reflected from the surface of record 11.

Beam 31 then passes through a double-lens system identical to that of a microscope, such as 27. This provides additional magnification. After reflection by prism 28, beam 31 passes through eye lens 29, which focuses the image similar to the action of an eye looking through a microscope. Lens 29 serves, therefore, to focus beam 31 upon mask 35, beam 31 reaching mask 35 after being reflected again by a prism 32. The aperture in mask 35 is preferably aligned to run in length perpendicular to the length of the image of groove 12. The length of the aperture in mask 35 corresponds to the maximum fluctuation of groove 12 from its normal position, as it wobbles to represent the wave pattern of the sound recorded. The width of the aperture in mask 35 represents the maximum length of groove 12, or the maximum recorded time interval, viewed at one time.

Fiber optic rods 37 and 38 each have one end mounted adjacent the aperture in mask 35. Rods 37 and 38 are joined at this one end to form a micro-fine junction 36. Therefore, each of fiber optic rods 37 and 38 carries in focus a portion of the masked image formed by the reflected light from the surface of record 11 to the respective light responsive device 41 or 42.

Referring now to FIG. 3, there is seen an arrangement of the various elements shown in FIG. 2 which can be used in a particular embodiment of the apparatus of this invention. FIG. 3 shows the passage of light from bulb 13 as it travels through telescope 14, makes a right angle reflection in prism 15, and another downward right angle reflection in prism 16 to pass through objective lens 17 toward record 11 in a substantially vertical direction. Light beam 30, the reflected light from the surface of record 11 which passes through the shaded portion of lens 17, is shown experiencing five reflections by prisms and polarizing filtration. In FIG. 3, the shading prism 21 and the next reflecting prism 22 of FIG. 2 are shown incorporated into a single rhombic prism 19. Thus beam 30 is reflected twice within prism 19, filtered by filter 23, and is then reflected as desired through prisms 24, 25 and 26 to contaiuue toward microscope 27 and eye lens 29 for focusing on mask 35.

In FIG. 4 the thick solid lines represent light beam 20 as it impinges upon record 11, including groove 12, at a substantially vertical angle. The dashed and thin solid lines indicate the reflected light from record 11 and groove 12 which comprises light beam 30 that will pass back through the shaded portion of objective lens 17. The broken lines indicate the reflected light which will not reach the shaded portion of objective lens 17. Note that the thin solid lines are those that undergo a pluraltiy of reflections before returning through lens 17 as part of beam 30. This portion of beam 30 has become polarized due to the multiple reflections and will not pass through polarizing filter 23. Therefore, only the dashed lines represent reflected light that will form light beam 31, which will ultimately provide the image of groove 12 and record 11 to the final transducing equipment.

It is thus apparent from FIG. 4 that only the substantially flat surface of record 11 on either side of groove 12, and the very central portion of groove 12, reflect light which will pass through the entire optical system. In the case of micro-grooves, such as are used on 45, 33⅓ and 16 r.p.m. records, the center of the groove is so small, and the angle for a vertical reflection is so critical, that this reflected light is substantially not noticable, and can be ignored. In the case of the much larger grooves of a 78 r.p.m. record, the central portion is quite visible. As will be more fully described below, FIGS. 5 and 6 describe how one embodiment of the apparatus of this invention operates on micro-grooved records, while FIG. 7 indicates how another embodiment of the apparatus of this invention operates on the grooves of a 78 r.p.m. record.

Referring now to FIG. 5, the wobbles of grooves 12 represent shorter wave lengths than are normally recorded on phonograph records. These shorter wave lengths, or high frequencies, were so illustrated to more clearly show the manner in which pickup of the image on the mask 35 of this invention is utilized.

Superimposed upon grooves 12 are shown a plurality of divided rectangles representing mask 35. The rectangles represent the relative position of the aperture in the mask to groove 12 at various intervals of time. It should be noted again that the actual division 36 within the aperture in the mask is micro-fine, rather than wide as shown illustratively in FIGS. 5, 6 and 7. The pictures of groove 12 shown within the circles of Column I represent the magnified versions of the mask positions immediately to the left. The rectangles of Column II show the image of the grooves within the two portions of the aperture, or in other words, those portions of the image which are striking fiber optic rods 37 and 38. The left rectangle shows the image within the left portion of the aperture in the mask, which travels in focus through fiber optic rod 37 to photosensitive device 41. The right rectangle shows the image within the right portion of the aperture in mask 35, which travels through fiber optic rod 38 to photosensitive device 42.

As record 11 rotates, various portions of groove 12's length pass into view under mask 35. As groove 12 wobbles left and right of centerline 36, in response to the wave form of the sound recorded, the wobbles are viewed through the aperture by light responsive devices 41 and 42.

The optical system of the apparatus of this invention is such that at mask 35 the image of the surface of record 11 appears white, while groove 12 appears black. When the image of groove 12 is to the right of center as shown in Row A of Columns I and II, there is more black to the right of center. Therefore, more black falls within the field of view of light responsive device 42, and correspondingly, device 42 receives less light. The electric current passing through device 42 is therefore altered. Conversely, device 41 receives more light and the electrical current therethrough is altered in the opposite direction.

It should be recalled that the grooves 12 of FIG. 5 represent those of a monophonic record, and therefore are of uniform width. When groove 12 deviates to the right, as described above, a small portion of it falls within the field of view of light responsive device 41. Because only a little black falls within the field of view of device 41, device 41 receives a greater portion of light. The decrease in the amount of light received by device 42 is equal to the increase in the amount of light received by device 41. The current passing through device 41 is inversely identical to that passing through device 42.

During a later time interval, such as at Row B of Columns I and II, the image of groove 12 is centered on the aperture of mask 35. Each of devices 41 and 42 has an equal portion of the image of groove 12 within its field of view, and the resulting electrical current through each is equal.

During a still later time interval, such as represented in Row C of Columns I and II, the image of groove 12 has wobbled to the left. As the main portion of the image of groove 12 is in the left portion of mask 35, light responsive device 41 will receive less light, and respond accordingly. Light responsive device 42, having less of the image of groove 12 within its field of view, receives more light, and passes an electrical current of inverse strength to that passing through device 41.

It is apparent from the above description of the operation of the apparatus of this invention, with reference to FIG. 5, that the output of light responsive devices 41 and 42 respond to the wobbles or deflections of groove 12 in record 11. Thus both outputs from devices 41 and 42 carry a signal representing the sound recorded on record 11.

The operation of the optical-electrical transducing apparatus of this invention can best be understood by now referring to FIG. 8. Assuming that the image of groove 12 is centered within the mask 35, as seen in Row B of FIG. 5, light responsive devices 41 and 42 allow equal amounts of currents to pass. In FIG. 8, devices 41 and 42 are represented by, respectively, photo-transistors 51 and 52. With an equal amount of current flowing through each of transistors 51 and 52, the outputs of DC amplifiers 57 and 58 will also be equal. Some of the AC portions of the outputs of amplifiers 57 and 58 will pass through capacitors 59 and 60 and be used as sound signals for conventional sound reproduction systems. The outputs of DC amplifiers 57 and 58 are also used to illuminate incandescent light bulbs 61 and 62.

Because the outputs of amplifiers 57 and 58 are equal, the intensity of light from bulbs 61 and 62 is also substantially equal. These equal intensities of light are felt by photo-sensitive devices 63 and 64, such as photo cells, and because devices 63 and 64 respond equally, there will be no change in the balance of the Wheatstone bridge and no signal at terminals 73 and 74 to actuate tone arm control device 75.

When the image of groove 12 in record 11 falls more or less in view of one of transistors 51 and 52 than the other, such as in Rows A and C of FIG. 5, one of transistors 51 and 52 conducts more current than the other and there is a correspondingly greater output from one of amplifiers 57 and 58 than there is from the other. As a result, one of lamps 61 or 62 glows with greater intensity than the other, and the response of photo cells 63 and 64 is such as to give them different resistances. Thus, the Wheatstone bridge goes out of balance, a signal appears at terminals 73 and 74 to be felt by tone arm control device 75, and as a result tone arm 18 is moved so that the image of groove 12 is again centered.

The position of the image of groove 12 determines the relative outputs of transistors 51 and 52 which provide a signal to device 75, which in turn controls the position of tone arm 18. This is a closed loop servo-system in which photo-transistors 51 and 52 are seeking minimum brightness, and thus follow groove 12 within the rotating record 11.

There is an inherent slight reluctance of incandescent lamps 61 and 62 to change their intensity of glow, and an inherent inertia present in the apparatus of control device 75 (which can include a motor, gear train and tone arm) which add time constants to the closed servo-system. These time constants limit the servo-system's ability to position the image of groove 12 so that it is at all times exactly within the center of the aperture in mask 35. Thus, tone arm 18, like that of a conventional needle phonograph, does not move back and forth in response to the wave forms recorded upon the record. Rather, it follows the average location of groove 12 in record 11, the variations from that average being the wave form of the sound recorded.

From the above discussion of the operation of the embodiment of FIG. 5, it is apparent that DC amplifiers 57 and 58 serve as both pre-amplifiers for sound, and control amplifiers for controlling the position of tone arm 18. Amplifiers 57 and 58 remain isolated from one another. They therefore do not interfere with one another when handling stereo signals. FIG. 6 shows the grooves 12 in a stereophonic record. The width of the record's grooves in FIG. 6 are seen to vary, as opposed to the constant width of the grooves in a monophonic record as in FIG. 5. Each edge of groove 12 in FIG. 6 shows a different wave form than the other. Thus the groove 12 in a stereophonic record records two independent sound wave forms. Again, the wobbles or the wave forms in each edge of groove 12 of FIG. 6 are exemplary of high frequency stereo recording for the purpose of explanation of the operation of the apparatus of this invention.

As in FIG. 5, the split rectangles represent the mask aperture at three different periods of time, superimposed upon grooves 12 in records 11. Magnified versions of the grooves at the intervals of time are shown in Column III, and the pairs of rectangles in Column IV show the image of groove 12 as it varies from side to side in the aperture of mask 35. With the image of groove 12 getting wider and narrower as different portions of the groove 12 pass into view, each of light responsive devices 41 and 42 is exposed to more or less of the blackness of the record's groove, and receives less or more light. Each edge of groove 12 represents a different wave worm. The amount of light that one of devices 41 and 42 momentarily receives is substantially independent of the amount of light that the other receives. Thus, the momentary amount of current allowed to pass through one of transistors 51 or 52 may differ from the inverse of the amount of current allowed to pass through the other cell. Independent channels of a stereophonic recording can be reproduced in this manner.

Though the output currents of DC amplifiers 57 and 58 fluctuate independently for stereo, their basic DC level remains interrelated. Should the image of the entire groove 12 be right or left of center, as seen in Rows D and F of FIG. 6, amplifiers 57 and 58 would be out of balance, and a signal would be provided to control device 75 to move tone arm 18 toward the center of groove 12. But, as in the case of a conventional phonograph, and as described above, the closed loop servo-system of this embodiment of the invention contains a time constant which makes it insensitive to the more rapid fluctuations resulting from the wave forms recorded.

FIG. 7 again shows a plurality of grooves 12. A white line 12a can be seen running along the center of the grooves 12. This line will be present in the playing of wider groove 78 r.p.m. records. Here again there are shown a plurality of masks 47 superimposed over various portions of groove 12 and centerline 12a. This mask 47 is similar to mask 35 described above, with the addition of another aperture mounted adjacent the aperture present in mask 35. Adjacent this additional aperture is a fiber optic rod 39 which carries the image from mask 47 in focus to another light responsive device 45. Device 45 may take the form of another photo-transistor with an associated output amplifier to provide sound signals to a standard sound reproduction system.

Interposed between device 45 and fiber optic rod 39 is a light filter of graduated density. Light falling upon the right portion of the filter passes through with negligible filtration. Light falling upon the left portion of the filter is obstructed by the filter and little if any light passes through. An intermediate amount of light is allowed to pass through the mid-portion of filter 44. Column V, Rows X, Y and Z shows the image of centerline 12a as it varies from right to center to left in the additional aperture of mask 47. When the image of line 12a is to the right of center as shown in Column V, Row X, it passes through the right portion of filter 44 nearly unobstructed. Thus the light reaching the device 45 is of maximum intensity, as seen in Column VI, Row X. When the image of centerline 12a is centered, as shown in Column V, Row Y, it passes through the mid-portion of filter 44 with an intermediate amount of filtration. The light reaching device 45 is of medium intensity, as seen in Column VI, Row Y. When the image of line 12a is to the left of center, as shown in Column V, Row Z, it is almost completely obstructed by filter 44. Light then reaches device 45 with a minimum of intensity as seen in Column VI, Row Z. Thus, the relative position of centerline 12a determines the intensity of light that light responsive device 45 receives. This causes the output of device 45 to vary, producing an electrical wave corresponding to the sound wave recorded at the base of groove 12 in a 78 r.p.m. record.

For 78 r.p.m. records the apertures in mask 47 which are similar to those in mask 35, that is the split rectangle, are again associated with fiber optic rods 37 and 38, and devices 41 and 42. In this case the signal from devices 41 and 42 is used only to control the position of tone arm 18, as described above in the discussion of FIG. 5, while sound reproduction emanates from the electrical signal at device 45.

At this point it is interesting to note that older or even antique 78 r.p.m. records which have been played on a usual needle type phonograph have experienced deformation and scratching which makes clear play-back difficult with a needle. However, the center of the groove is protected by the sides of the groove. It therefore generally does not experience the scratching and wear that occurs in the grooves near the surface of the record. By optically playing back such records there is no further wear and the quality of the records is preserved. Further, old and worn records can be played with greater clarity as only the center of the groove is used.

It is apparent that the general principles disclosed in the description of the embodiments above are applicable to many variations and can be used in other embodiments. It should be especially noted that the number of prisms, and the placement of the prisms in the optical system, can be varied depending on the particular configuration of the chassis desired.

It should be noted that the optical system, for easier viewing, can contain accromatic lenses and can be color corrective throughout, or, by incorporating a filter to remove all light except for a wave length to which the photo-transistors are most sensitive, inexpensive non-accromatic plastic lenses could be substituted in most cases.

In many cases, if desired, the size of the optical system can be reduced by drawing the fiber optic rods down to a smaller scale at the masked ends. Then the image projected upon them need not be as large, and the amount of magnification needed can be reduced. A plurality of various mechanical devices could satisfactorily be used for the control of the position of the tone arm, and rotation of the turntable. Further, suitable mechanism can be provided for the vertical adjustment of the tone arm for proper focusing of the beam of light upon the groove of the record.

The embodiments of the invention in which an exclusive property or privilege is claimed are defined as follows:

1. In a phonograph system including a turntable for rotating a grooved phonograph record, a tone arm, and means for rotating the turntable and moving the tone arm, the improved transducer comprising:
   a light source;
   an objective lens;
   first optic means mounted between said light source and said objective lens for providing a beam of light through said objective lens to impinge upon and reflect from a phonograph record mounted on the turntable;
   sound reproduction means;
   second optic means mounted between said objective lens and said sound reproduction means for providing an optical signal to be reproduced as sound;
   said second optic means including an optic member mounted between said first optic means and said optic lens to shade a predetermined portion of said objective lens from the beam of light;
   said optic member further mounted to receive light reflected from the record and through said shaded portion of said objective lens for directing the reflected light through said second optic means; and
   a polarizing filter mounted in said second optic means for preventing reflected polarized light from the record from reaching said sound reproducing system.

2. The improved transducer of claim 1 in which said second optic means includes:
   a light mask defining a selected aperture therein;
   a pair of fiber optic rods;
   one end of each of said rods being mounted within the aperture formed in said mask, said one ends of said rods being joined together to form a micro-fine junction substantially dividing the aperture;

means within said second optic means for directing the reflected light against said one ends of said rods; and means connecting the other end of each of said rods to said sound reproducing means for the direction of reflected light thereto.

3. The improved transducer of claim 2 in which said sound reproducing means includes:

first and second photo-sensitive current conducting means, each connected in electrical circuit;

each of said first and second photo-sensitive current conducting means being mounted adjacent one of said other ends of said fiber optic rods for varying the current conducted by said photo-sensitive means in proportion to the light passing through said rods; and means connecting an output terminal on each of said photo-sensitive means to sound reproduction means.

4. The improved transducer of claim 3 including tone arm position control means comprising:

first and second signal generating means connected, respectively, to the output terminals on said first and second photo-sensitive current conducting means, the signal generated from said signal generating means being controlled by the current through said photo-sensitive means;

four-legged electrical balanced bridge means including signal-sensitive current conducting means mounted in two of said legs, said signal-sensitive means adapted to receive signals from said signal generating means to vary the current conducted through said signal-sensitive means;

output terminals on said bridge means; and means connecting said output terminals to the means for moving the tone arm, for providing a control signal for movement of the tone arm when said bridge means is electrically unbalanced.

5. The improved transducer of claim 4 in which:

said signal generating means comprise incandescent light bulbs; and said signal-sensitive means comprise photocells.

6. The improved transducer of claim 4 in which said photo-sensitive current conducting means comprise photo-transistors.

7. The improved transducer of claim 1 including:

a light mask defining a selected aperture therein;

a pair of fiber optic rods;

one end of each of said rods being mounted within the aperture formed in said mask, said one ends of said rods being joined together to form a micro-fine junction substantially dividing the aperture;

a second selected aperture defined in said mask, adjacent the first aperture;

a third fiber optic rod having one end mounted within the second aperture;

means within said second optic means for directing the reflected light against said one ends of said rods;

means connecting the other end of each of said pair of rods to the means for moving the tone arm;

light responsive means connected to said sound reproducing means; and optical filter means mounted between the other end of said third rod and said light responsive means, the density of said optical filter means being graduated so that the intensity of the reflected light striking said light responsive means after leaving said third rod is dependent on the position on said optical filter means at which the reflected light hits.

8. The improved transducer of claim 1 in which said first optic means includes:

optical prism means;

a telescope mounted between said light source and said optical prism means for providing a narrow, substantiall parallel beam of light to said prism means; and said prism means aligned to direct the beam of light through said objective lens substantially perpendicular to the record on the turntable.

9. The improved transducer of claim 1 in which:

said optic member comprises a rhombic prism;

said second optic means includes a plurality of optical prisms and magnifying lenses for magnifying and directing the reflected light to said sound reproduction means; and a polarizing filter is mounted between said rhombic prism and said plurality of optical prisms and magnifying lenses to block the reflected light which has been polarized.

10. In a phonograph system with optical pick-up means for the reproduction of sound from a grooved phonograph disc and including a tone arm, a turntable, and control means for the tone arm and turntable, the optical pick-up means providing an output comprising a continuous reflected image of the groove in the disc as the relative position of the tone arm along the groove varies, transducer apparatus for changing the reflected image to electrical signals comprising:

mask means defining an aperture therein;

first and second fiber optic rods, each having one end mounted within the aperture in said mask, said one ends of said rods being joined to form a micro-fine junction substantially dividing the aperture;

means in the optical pick-up means for directing the reflecting image of the groove against said one ends of said rods;

light responsive means mounted adjacent the other ends of said rods; and means in circuit with said light responsive means for providing signals to the tone arm control means and to sound reproduction means.

11. The apparatus of claim 10 in which said light responsive means comprises:

first and second photo-transistors;

said first photo-transistor connected in a first electrical amplifying circuit and adjacent the other end of said first fiber optic rod, for provviding an electrical signal in response to light transmitted through said first rod; and said second photo-transistor connected in a second electrical amplifying circuit and mounted adjacent the other end of said second fiber optic rod, for providing an electrical signal in response to light transmitted through said second rod.

12. The apparatus of claim 11 in which said means in circuit with said light responsive means comprises:

first means connected to an output terminal on said first amplifying circuit;

second means connected to an output terminal on said second amplifying circuit;

sound reproduction means connected to said first and second means;

first and second incandescent light bulbs connected, respectively to said first and second means;

first and second photo-cells mounted, respectively, adjacent said first and second bulbs;

means connecting said first and second photo-cells in a Wheatstone bridge configuration; and means connecting the output of said bridge to the tone arm control means.

13. In a phonograph system with optical pick-up means for the reproduction of sound from a grooved phonograph disc and including a tone arm, a turntable, and control means for the tone arm and turntable, the optical pick-up means providing an output comprising a continuous reflected image of the groove in the disc as the relative position of the tone arm along the groove varies, transducer apparatus for changing the reflected image to electrical signals comprising:

mask means defining first and second adjacent apertures therein;

first and second fiber optic rods, each having one end mounted within the first aperture in said mask, said one ends of said rods being joined to form a microfine junction substantially dividing the aperture;

a third fiber optic rod having one end mounted in the second aperture in said mask;

means in the optical pick-up means for directing the reflected image of the groove against said one ends of said first, second and third rods;

first and second light responsive means mounted, respectively, adjacent the other end of said first and second rods;

third light responsive means mounted adjacent the other end of said third rod;

signal means mounted in circuit with said first and second light responsive means for providing a signal to the tone arm control means; and sound reproduction means mounted in circuit with said third light responsive means.

14. The apparatus of claim 13 in which said first and second light responsive means comprise, respectively:

first and second photo-transistors;

said first photo-transistor connected in a first electrical amplifying circuit and mounted adjacent the other end of said first fiber optic rod, for providing an electrical signal in response to light transmitted through said first rod; and said second photo-transistor connected in a second electrical amplifying circuit and mounted adjacent the other end of said second fiber optic rod, for providing an electrical signal in response to light transmitted through said second rod.

15. The apparatus of claim 14 in which said signal means comprises:

first means connected to an output terminal on said first amplifying circuit;

second means connected to an output terminal on said second amplifying circuit;

first and second incandescent light bulbs connected, respectively to said first and second means;

first and second photo-cells mounted, respectively, adjacent said first and second bulbs;

means connecting said first and second photo-cells in a Wheatstone bridge configuration; and means connecting the output of said bridge to the tone arm control means.

16. The apparatus of claim 13 in which said third light responsive means comprises:

photo-sensitive current conducting means connected in electrical circuit with sound reproduction means; and optical filter means mounted between the other end of said third fiber optic rod and said photo-sensitive current conducting means, the density of said filter means being graduated to vary the intensity of light striking said photo-sensitive means dependent on the position at which the light strikes on said filter means.

References Cited

UNITED STATES PATENTS

| | | | |
|---|---|---|---|
| 1,916,973 | 7/1933 | Friebus | 179—100.4 |
| 1,891,227 | 12/1932 | Friebus | 179—100.3 X |
| 1,917,003 | 7/1933 | Williams | 179—100.4 |
| 1,967,882 | 7/1934 | Hammond | 179—100.3 |
| 2,654,810 | 10/1953 | Miessner | 179—100.3 |
| 2,691,736 | 10/1954 | Haynes | 250—211 |
| 2,838,683 | 6/1958 | Munro | 250—227 |
| 3,138,669 | 6/1964 | Rabinow et al. | 179—100.4 |
| 3,325,603 | 6/1967 | Rabinow et al. | 179—100.41 |

FOREIGN PATENTS

| | | |
|---|---|---|
| 1,147,664 | 4/1963 | Germany. |

BERNARD KONICK, *Primary Examiner.*

RAYMOND F. CARDILLO, Jr., *Assistant Examiner.*

U.S. Cl. X.R.

179—100.41